United States Patent
Acheson et al.

(10) Patent No.: US 7,556,223 B2
(45) Date of Patent: Jul. 7, 2009

(54) VENT SYSTEM FOR AN AEROSPACE VEHICLE

(75) Inventors: Kurt E. Acheson, Seattle, WA (US); David S. Chambers, Bellevue, WA (US); Brian S. Kornegay, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 11/566,504

(22) Filed: Dec. 4, 2006

(65) Prior Publication Data

US 2008/0128557 A1   Jun. 5, 2008

(51) Int. Cl.
*B64D 37/00* (2006.01)

(52) U.S. Cl. .............................. 244/135 R; 244/129.1; 454/76

(58) Field of Classification Search ............. 244/135 R, 244/129.1, 53 B, 135 A; 454/76
See application file for complete search history.

(56) References Cited

U.S. PATENT DOCUMENTS

| | | | | |
|---|---|---|---|---|
| 2,460,368 | A | * | 2/1949 | Snow .......................... 220/651 |
| 3,199,812 | A | * | 8/1965 | Spoecker ................. 244/135 R |
| 4,567,924 | A | * | 2/1986 | Brown ......................... 141/207 |
| 6,491,255 | B1 | * | 12/2002 | Bracken et al. ......... 244/135 R |
| 6,758,743 | B1 | | 7/2004 | Grosskrueger |

FOREIGN PATENT DOCUMENTS

GB       486983       6/1938

OTHER PUBLICATIONS

Ruggeri et al., "Investigation of Aerodynamic and Icing Characteristics of Recessed Fuel-Vent Configurations", National Advisory Committee for Aeronautics Technical Note No. 1789, Washington, Mar. 1949, pp. 1-64.

Grottadaurea et al., "Noise sources from a cylindrical cavity", American Institute of Aeronautics and Astronautics, 2007, 13th AIAA/CEAS Aeroacoustics Conference, US, pp. 1-12.

* cited by examiner

*Primary Examiner*—Michael R Mansen
*Assistant Examiner*—Michael Kreiner
(74) *Attorney, Agent, or Firm*—Yee & Associates, P.C.; Brett L. Halperin

(57) ABSTRACT

An improved vent system for venting an internal cavity of an aerospace vehicle to an exterior surface of the aerospace vehicle generally includes a substantially concave vent inlet surface recessed with respect the exterior surface, and a duct opening formed therein. The vent inlet surface has a major axis substantially parallel to the local external flow direction. The upstream surface contour and the downstream surface contour of the vent inlet surface are substantially oblique to the local external flow direction. The placement and orientation of the duct opening, as well as the geometry of the vent inlet surface, may be selected to achieve a particular pressurization of the internal cavity with respect to the external environment under a variety of conditions.

17 Claims, 1 Drawing Sheet

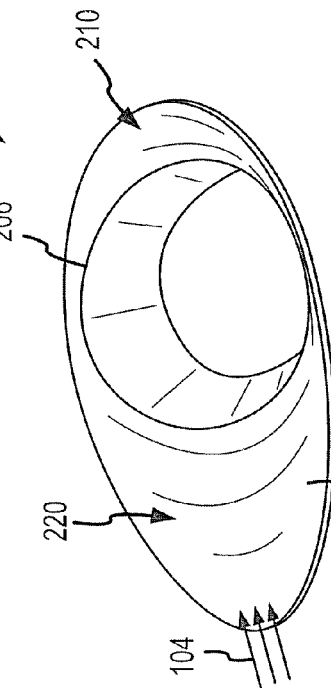
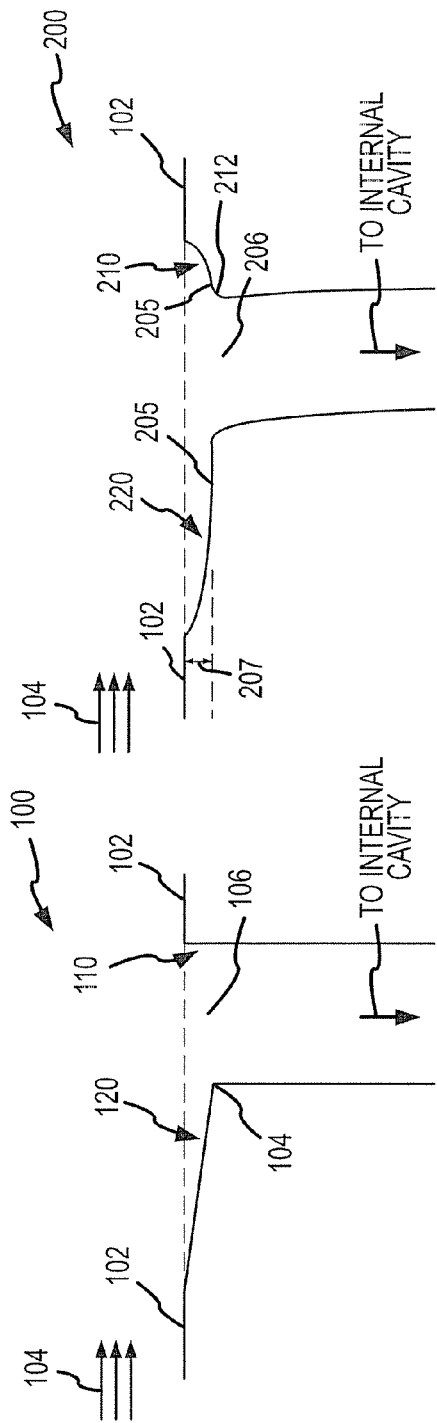
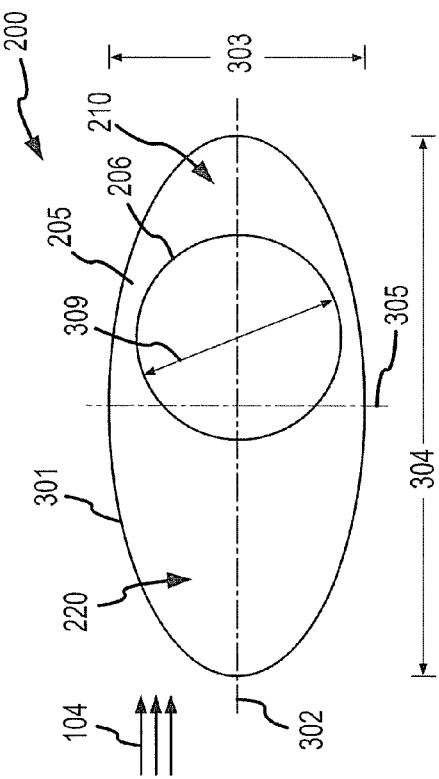

VENT SYSTEM FOR AN AEROSPACE VEHICLE

TECHNICAL FIELD

The present invention generally relates to aerospace vehicles, and more specifically relates to systems for venting internal cavities of aerospace vehicles.

BACKGROUND

Aerospace vehicles utilize venting systems to equalize the pressure between the external environment and various internal cavities. Aircraft fuel systems, for example, are fitted with one or more ventilation ports configured to maintain fuel tank pressure within design limits throughout the operating flight envelope. Ventilation is particularly critical during steep climbs and descents where ambient pressure changes rapidly, potentially imposing a pressure gradient across tank walls. Design of the ventilation port itself is complicated by the fact that the port should typically act as a reasonably efficient nozzle under flight conditions where fuel system is under positive pressure, but should also act as a reasonably efficient inlet when the tank is under negative pressure.

Existing ventilation ports generally take the form of an inlet, often a flush scoop. These scoops are specifically intended to bring ambient air into a system with minimal impact on the ambient flow field. Thus, they pressurize the fuel system during descent when the tank is under suction pressure (e.g., as required during descent). However, the dynamic pressure head generated by such inlets acts to retard ventilation flow out of the system when tank pressure exceeds ambient pressure (e.g., as required during climb).

Because the inlet brings air onboard nearly parallel to the local external flow direction, ducting is required to turn the flow into the tank. This ducting requires volume, and increases system weight and cost.

Other prior art ventilation systems use flush holes. Such holes are advantageous in that they reduce system volume and weight because the vent port can feed the tank directly without the need for routing ducts. Relative to a flush inlet, a flush hole trades degraded performance while bringing air into the fuel system to improve system efficiency when purging air out of the fuel system, such as would occur as the aircraft climbs. This system also reduces the peak positive pressure that the fuel tank needs to accommodate, providing an additional opportunity to reduce structural weight. However, flush holes are notorious for generating tonal whistles, known as organ pipe or Helmholtz resonances, when the ventilation flow rates are low.

Prior art venting systems are thus undesirable in a number of respects. For example, typical ventilation ports do not permit tank pressures to neutralize quickly, and therefore necessitate increased aircraft weight as the fuel system tanks and ducting are strengthened to withstand a broader range of operating pressures. In addition, there is a need for venting systems that fit compactly within the aircraft to maximize flexibility in placement while minimizing the weight and cost of any required ducting. There is also a need for duct systems that result in minimal disruption of the ambient flow, thus providing the highest permissible aircraft aerodynamic performance. It is also desirable that duct systems be passive rather than active in nature (to minimize cost and maximize system reliability), and to avoid collateral impacts such as acoustic resonance and the like. Furthermore, inlet-configured ports are biased to pressurize the tank. They also require ducting to turn vent flows inside the mold-line, thus adding weight.

Accordingly, it is desirable to provide improved venting systems for venting fuel tanks and other such internal cavities. Other desirable features and characteristics of the present invention will become apparent from the subsequent detailed description and the appended claims, taken in conjunction with the accompanying drawings and the foregoing technical field and background.

BRIEF SUMMARY

The present invention provides an improved vent system for venting an internal cavity of an aerospace vehicle to an exterior surface of the aerospace vehicle. The vent system generally includes a concave vent inlet surface recessed with respect the exterior surface, and a duct opening formed therein. The vent inlet surface has a major axis parallel to the local external flow direction. The upstream surface contour and the downstream surface contour of the vent inlet surface are oblique to the local external flow direction. The placement of the duct opening, as well as the geometry of the vent inlet surface, may be selected to achieve a particular pressurization of the internal cavity with respect to the external environment under a variety of conditions.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 1 is a cross-sectional view of a typical prior art vent system;

FIG. 2 is a cross-sectional view of an exemplary vent system in accordance with one embodiment of the present invention;

FIG. 3 is a top view corresponding to the vent system illustrated in FIG. 2; and FIG. 4 is an isometric view of the vent system illustrated in FIG. 2.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the sake of brevity, conventional techniques and features related to fuel tanks, venting systems, aeronautics, and fluid dynamics may not be described in detail herein. The various drawings are not necessarily intended to show relative scale.

In general, the present invention relates to a concave or ("dish-shaped") vent inlet surface recessed within an exterior surface of an aerospace vehicle, such as a wing surface or access panel. The vent inlet surface includes a duct opening leading to an internal cavity (e.g., a fuel tank), wherein the vent inlet surface has a oblique upstream surface contour and a oblique downstream surface contour with respect to the duct opening and the local external flow direction.

More particular, referring to the side, top, and isometric views shown in FIGS. 2, 3, and 4, respectively, an exemplary vent system for an aerospace vehicle includes a vent inlet surface 205 ("vent inlet" or simply "inlet") and a duct opening 206 leading to an internal cavity of the aerospace vehicle (e.g., a fuel tank or any other internal cavity requiring venting, not shown).

Vent inlet surface 205 is concave and recessed with respect to an external surface 102 (e.g., a wing surface of the aerospace vehicle). Stated another way, vent inlet surface 205 is generally "dish shaped," and lies below the external surface 102. Those skilled in the art will recognize that such recessed vents are often referred to as "flush." This configuration minimizes impact on the ambient environment outside of the internal cavity. Vent inlet surface 205 has a local minimum, preferably where it joins duct opening 206, that defines a "depth" of the surface (depth 207 in FIG. 2). This "dish shaped" inlet is considered a form of "flush" inlet in that none of its surface protrudes into the prevailing freestream flow. This structure helps to reduce or eliminate associated acoustic tones and to make vent port flow more efficient.

A local external flow direction 104 is defined with respect to external surface 102. That is, depending upon the location of vent system 200, the nominal direction of airflow over the vent system may vary. In general, however, the direction of the local external flow on any point of an aerospace vehicle will generally be known a priori due to computer modeling, empirical testing, and the like.

As shown in FIG. 3, vent inlet surface 205, in the illustrate embodiment, has a major axis 302 and a minor axis 305. The terms "minor axis" and "major axis" are used in the broadest sense (i.e., to indicate the long and short dimensions of the shape), and are not limited to elliptical shapes. In the illustrated embodiment, major axis 302 is substantially parallel to local external direction 104—i.e., within a few degrees of parallel. Inlet surface 205 may have any suitable aspect ratio; the illustrated proportions are not intended to be limiting.

In the illustrated embodiment, there is a distinct major axis because the flow is coming substantially from one direction. If the application called for the flow to come from a variety of directions, the directional bias would be reduced. Stated another way, one would examine the geometry cross-sections in all directions of flow, and contour the inlet accordingly.

Duct opening 206 leads to the internal cavity requiring venting, and may therefore be coupled to a suitable duct or other structure (not shown) allowing fluid communication between surface 205 and the internal cavity. In one embodiment, duct opening 206 is substantially circular with its center lying on major axis 302 and has a diameter 309. It may, however, have any suitable shape, be placed anywhere within inlet 205, and be canted at any angular orientation necessary to provide a predetermined level (or range) of pressurization with respect to the internal cavity. Those skilled in the art will recognize how to determine these dimensions using empirical methods, computer simulation, and the like.

In general, shaping the duct is informed by structural constraints on the aircraft as well as system requirements. Circular ducts are efficient at carrying loads (and are lighter) and can be manufactured cheaply. However, if the port needs to take up a certain area (e.g., 10 square inches), and there is a structural obstruction that will not permit a circular duct, then the duct can be altered to fit in the required space.

Inlet surface 205 has an upstream area 220 and a downstream area 210. Upstream area 220 corresponds to the region of surface 205 that is upstream of duct opening 206 with respect to local external direction 104, and downstream area 210 corresponds to the region of surface 205 that is downstream of duct opening 206 with respect to local external direction 104. As shown in FIG. 2, upstream area 220 has a contour (i.e., side view profile), as does downstream area 210.

For the purposes of simplicity, the side view contour of upstream area 220 will be referred to as "upstream surface contour 220," and the side view contour of downstream area 210 will be referred to as "downstream surface contour 210."

In accordance with one embodiment, upstream surface contour 220 and/or downstream surface contour 210 are oblique to local external flow direction 104. That is, if a surface normal vector were to be drawn on upstream surface contour 220, that vector would, over substantially all of the surface contour, be neither perpendicular to nor parallel to local external flow direction 104. Stated yet another way, the upstream and downstream surfaces are "sloped" in a desirable manner. In this way, independent of whether flow is entering or departing the fuel system, through-vent flows encounter the ambient flow at oblique angles. The sloping contours also serve to reduce or eliminate the source of Helmholtz resonance and ice accumulation present in prior art venting systems, as there is less impingement on the back (downstream) wall of the vent.

Surface contour 210 may be curvilinear (e.g., parabolic, arc-shaped, etc.) or may be rectilinear (e.g., flat polygonal surfaces leading from duct opening 206 to surface 102), or a combination thereof. In a further embodiment, the edges where inlet surface 205 meets exterior surface 102 are rounded. Similarly, the edge or edges of inlet surface 205 at duct opening 206 may also be rounded to improve the air flow.

In general, all surfaces within 205 (i.e., 210 and 220) may be curvilinear or rectilinear. The shape is not as important as simply interfacing with surface 102 obliquely, wherein the sectional area of the inlet cut-out of 102 is substantially larger than the duct area.

Inlet 205 has a vent shape 301, as shown in FIG. 3, defined by the intersection of surface 205 with exterior surface 102. Vent shape 301 may be any suitable shape, including rectilinear shapes (polygonal, rectangular, etc.), curvilinear shapes (circles, ellipses, ovals, arbitrary closed curves, etc.), or a combination thereof. Vent shape 301 is generally a closed curve, and in many embodiments is symmetrical—i.e., exhibits reflectional symmetry with respect to major axis 302. In a particular embodiment, vent shape 301 is an ellipse, as shown, having a major axis dimension 304.

The dimensions and relative positions of inlet 205 and duct opening 206 may be selected to achieve any suitable design goals, depending upon, for example, the anticipated speed of the local external flow (nominal Mach number during operation), the nature of surface 102, and the expected behavior of the aerospace vehicle (e.g., climb rate, cruise speed, descent rate). Depth 207 of inlet surface 205 is equal to approximately 25% of diameter 309 of duct opening 206. Major axis dimension 304 is approximately twice diameter 309 of duct opening 206. Although the selected sizes and dimensions may vary depending upon application, in a typical embodiment (e.g., a fuel tank vent placed on the wing surface of a commercial airplane), major axis dimension 304 is about 7-9 inches, the minor axis dimension 303 is approximately 3-5 inches, the depth 207 is approximately 0.3-0.8 inches, and the diameter 309 of duct opening 206 is approximately 3-4 inches with a cross-sectional area of about 10 square inches. It will be appreciated, however, that these dimensions are not intended to be limiting, and that the invention encompasses a wide range of dimensions and shapes. In one embodiment, the vent inlet has an area that is greater than or equal to approximately 1.5 times the duct opening area While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. An apparatus comprising:
an aerospace vehicle having an exterior surface; and
a vent in the aerospace vehicle, the vent comprising:
a vent inlet surface that comprises a recessed portion of the exterior surface of the aerospace vehicle; and,
a duct opening in the vent inlet surface for directing air from a local external air flow to an internal cavity in the aerospace vehicle, and for purging air from the internal cavity,
wherein the vent inlet surface has a vent inlet surface shape that is concave with respect to the exterior of the aerospace vehicle, and has a major axis substantially parallel to a direction of the local external air flow, and a minor axis substantially perpendicular to the direction of the local external air flow, and wherein the vent inlet surface further has an oblique surface contour upstream of the duct opening with respect to the direction of the local external airflow and an oblique surface contour downstream of the duct opening with respect to the direction of the local external air flow, and wherein the vent inlet surface is rounded at an intersection of the vent inlet surface and the duct opening.

2. The apparatus of claim 1, wherein the vent inlet surface shape is further defined by an intersection of the vent inlet surface with the exterior surface, and wherein the vent inlet surface has reflectional symmetry with respect to the major axis.

3. The apparatus of claim 2, wherein the duct opening has a diameter, and wherein the vent inlet surface has a depth, with respect to the exterior surface, that is greater than or equal to approximately 25% of the duct opening diameter.

4. The apparatus of claim 2, wherein the duct opening has a duct opening area, and wherein the vent inlet surface has an area that is greater than or equal to approximately 1.5 times the duct opening area.

5. The apparatus of claim 1, wherein the exterior surface is a wing access panel of the aerospace vehicle, and wherein the internal cavity is a fuel tank.

6. The apparatus of claim 1, wherein the vent inlet surface shape on the exterior surface of the aerospace vehicle is elliptical.

7. A vent system for venting an internal cavity of an aerospace vehicle to an exterior surface of the aerospace vehicle, wherein the exterior surface has an associated local external flow direction, the vent system comprising:
a vent inlet surface that comprises a recessed portion of the exterior surface, the vent inlet surface having a vent inlet surface shape that is concave with respect to the exterior of the aerospace vehicle and having a major axis substantially parallel to the local external flow direction and a minor axis substantially perpendicular to the local external flow direction; and
a duct opening in the vent inlet surface for directing air from a local external airflow to an internal cavity of the aerospace vehicle and for purging air from the internal cavity, wherein the vent inlet surface has an oblique surface contour upstream of the duct opening with respect to the direction of the local external airflow, and an oblique surface contour downstream of the duct opening with respect to the direction of the local external airflow.

8. The vent system of claim 7, wherein the vent inlet surface shape further has reflectional symmetry with respect to the major axis.

9. The vent system of claim 8, wherein the vent inlet surface shape on the exterior surface of the aerospace vehicle is elliptical.

10. The vent system of claim 7, wherein the oblique surface contour upstream of the duct opening with respect to the direction of the local external airflow and the oblique surface contour downstream of the duct opening with respect to the direction of the local external airflow are curvilinear.

11. The vent system of claim 7, wherein the oblique surface contour upstream of the duct opening with respect to the direction of the local external airflow and the oblique surface contour downstream of the duct opening with respect to the direction of the local external airflow include rounded corners at the duct opening.

12. The vent system of claim 7, wherein the duct opening has a diameter, and wherein the vent inlet surface has a depth, with respect to the exterior surface, that is greater than or equal to approximately 25% of the duct opening diameter.

13. The vent system of claim 7, wherein the duct opening has an area, and wherein the vent inlet surface has an area that is greater than or equal to approximately 1.5 times the duct opening area.

14. A method for venting an interior cavity of an aerospace vehicle to an exterior surface of the aerospace vehicle, wherein the exterior surface has a local external flow direction, the method comprising:
forming a vent inlet surface that comprises a recessed portion of the exterior surface wherein the vent inlet surface has a vent inlet surface shape that is concave with respect to the exterior of the aerospace vehicle and has a major axis substantially parallel to the local external flow direction and a minor axis substantially perpendicular to the local external airflow direction, and wherein the vent inlet surface further has an oblique surface contour with respect to the local external flow direction;
forming a duct opening in the vent inlet surface; and
connecting the duct opening to the internal cavity via a duct for directing air from a local external airflow to the internal cavity, and for purging air from the internal cavity.

15. The method of claim 14, wherein the duct opening within the vent inlet surface is configured to provide a predetermined pressurization of the internal cavity.

16. The method of claim 14, wherein forming the vent inlet surface further comprises forming the vent inlet surface to a depth that is approximately 25% of a diameter of the duct opening and to have a major axis dimension that is approximately twice the diameter of the duct opening.

17. The method of claim 14, wherein forming the vent inlet surface further comprises forming the vent inlet surface to have a substantially elliptical shape.

* * * * *